(12) United States Patent
Agranov

(10) Patent No.: US 7,796,180 B2
(45) Date of Patent: Sep. 14, 2010

(54) METHOD FOR CALCULATING CIRCULAR SYMMETRICAL MICROLENS/COLOR FILTER ARRAY SHIFT

(75) Inventor: Gennadiy A. Agranov, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 1442 days.

(21) Appl. No.: 11/195,692

(22) Filed: Aug. 3, 2005

(65) Prior Publication Data

US 2007/0030379 A1 Feb. 8, 2007

(51) Int. Cl.
*G02B 13/16* (2006.01)
*H04N 5/225* (2006.01)

(52) U.S. Cl. ................ 348/335; 348/340; 348/370; 348/374; 348/348

(58) Field of Classification Search ............. 348/335, 348/340, 345, 348, 370, 374; 359/362, 368, 359/372, 431, 434
See application file for complete search history.

(56) References Cited

U.S. PATENT DOCUMENTS

| 5,059,008 | A | * | 10/1991 | Flood et al. ............ 359/196.1 |
| 6,140,630 | A | | 10/2000 | Rhodes |
| 6,204,524 | B1 | | 3/2001 | Rhodes |
| 6,310,366 | B1 | | 10/2001 | Rhodes |
| 6,326,652 | B1 | | 12/2001 | Rhodes |
| 6,333,205 | B1 | | 12/2001 | Rhodes |
| 6,376,868 | B1 | | 4/2002 | Rhodes |
| 6,852,591 | B2 | | 2/2005 | Rhodes |
| 6,888,686 | B2 | * | 5/2005 | Do ............................ 359/717 |
| 2004/0165097 | A1 | * | 8/2004 | Drowley et al. ............. 348/340 |

OTHER PUBLICATIONS

G. Agranov, et al., IEEE Transactions on Electron Devices, ED-50, 2003 pp. 4-11/ Jan. 2003.

* cited by examiner

*Primary Examiner*—Yogesh K Aggarwal
(74) *Attorney, Agent, or Firm*—Dickstein Shapiro LLP

(57) ABSTRACT

An image sensor formed with shifts among the optical parts of the sensor and the photosensitive parts of the sensor. Exemplary methods of calculating the desired shift are described and include a circular, symmetric design for the shift. The exemplary methods can also be used to calculate a correction coefficient for performing shading correction on signals that are output from the array and digitized.

4 Claims, 11 Drawing Sheets

METHOD FOR CALCULATING CIRCULAR SYMMETRICAL MICROLENS/COLOR FILTER ARRAY SHIFT

FIELD OF THE INVENTION

The invention relates generally to improved imaging systems using image sensor pixel arrays, and more particularly, to optimizing a shift among optical parts, including a microlens and color filter array, in the imaging system.

BACKGROUND OF THE INVENTION

Image sensors receive light into an array of photosensitive pixels. Each pixel may be formed of a number of cooperating elements including, for example, a lens, often called a "microlens," a color filter which can block incoming light of a particular color(s) from reaching the photosensitive portion, and the photosensitive portion itself. These elements are typically formed on different physical levels of a substrate. Traditionally, the elements of the pixels should have their centers substantially exactly aligned. That is, the microlens, the color filter, and the photosensitive portion should each be substantially coaxial.

One of the difficulties in designing and implementing imaging systems is the optimization of individual pixels within a pixel array. The problem becomes significant in imaging applications receiving non-telecentric light, where different pixels of the array are illuminated with light having different chief ray angles, depending on the location of the pixel in the array. Examples of non-telecentric light sources include cameras for cellular phones and imaging handsets.

In non-telecentric applications, a pixel at the center of the array receives light with a chief ray angle of 0 degrees, while pixels at the corners of the array may receive light with chief ray angles up to about 30 degrees. In addition, the relative illumination of the imaging lens results in large (up to 50%) degradation of light intensity across the array. This means that signals output from pixels at an edge of the array can be significantly degraded.

The standard way to optimize pixel characteristics for non-telecentric light is to shift the microlens-color filter array in an effort to minimize signal degradation and color distortion. One method for calculating a lens shift, for minimizing the signal degradation caused by cross-talk among pixels, is disclosed in U.S. Pub. No. 2005/0061951, assigned to Micron Technology Inc., and incorporated herein by reference. The remaining signal degradation, such as the signal degradation due to the relative illumination of the imaging lens, can be compensated for by using digital lens shading correction techniques.

FIG. 1 illustrates the general idea of using a microlens-color filter array shift to optimize pixel performance for different chief ray angles of light from an imaging lens. As shown in FIG. 1, an image sensor 10 includes a microlens array 12, a color filter array 13, and a pixel array 14. Incoming light 11 is produced from an imaging lens 15, such that individual rays of light 11a, 11b, 11c, 11d strike the pixel array 14 at different angles. Rather than having a center of each microlens 12a aligned with a center of a respective color filter 13a and a corresponding pixel center 14a, the microlens array 12 and color filter array 13 are shifted with respect to each other, to focus the incoming light 11 onto underlying, photosensitive regions of the pixel array 14.

One way of calculating the microlens-color filter array shift and building a digital lens shading correction algorithm for the imager is based on the orthogonal X and Y coordinate system. The positions of the microlens-color filter array along the X and Y-axes are calculated using an imaging lens-chief ray angle function. Then, as illustrated in FIG. 2, the position of the microlens-chief ray angle for all other pixels within the array are calculated as a product of a corresponding shift along the X and Y coordinate axis. For example, the microlens shift ($\Delta S$) for pixels [k,0], [0,1], [m,0], [0,n] are determined from the chief ray angle as a function of X and Y coordinates. The microlens shift for pixels [k,l] and [m,n] are determined using the following equations:

$\Delta S_{k,l}$=square root(($\Delta S_{k,0})^2+(\Delta S_{0,l})^2$); where $\Delta S_{k,l}$ is the calculated shift for a pixel in column "k" and row "l," and $\Delta S_{m,n}$=square root(($\Delta S_{m,o})^2+(\Delta S_{0,n})^2$) where $\Delta S_{m,n}$ is the calculated shift for a pixel in column "m" and row "n."

The same method is used for calculating the correction coefficients in a digital lens shading correction algorithm. Signal processing circuitry applies the correction coefficient to the digitized versions of output signals that are received from pixels in the pixel array. This correction is done to account for the difference in illumination of a signal across the array.

This orthogonal method works well with imaging lenses that have linear dependence of the chief ray angle as a function of the relative image height (i.e., "field"). Imaging lenses that have non-linear behavior of the chief ray angle as a function of image height, however, have difficulty in using the orthogonal method. Specifically, the microlens-color filter locations and the lens shading correction can not be fully optimized for the imaging lens, which results in non-uniform signal response as well as color distortion.

FIGS. 3a-3b show graphs illustrating chief ray angle versus image height for two typical lens designs. FIG. 3a represents a lens with a linear chief ray angle as a function of field. FIG. 3b represents a lens with a non-linear chief ray angle as a function of field. The orthogonal optimization method described above results in good agreement between the desired and actual lens shift for the linear case, as shown in FIG. 4. FIG. 4 is a graph depicting the microlens shift needed and the actual microlens shift obtained using the orthogonal algorithms discussed above; as can be seen, the actual and needed shifts correspond well. On the other hand, there is a significant discrepancy in the needed and actual microlens shift for the non-linear case (FIG. 3b) of the imaging lens, as shown in FIG. 5. In this case, as the image height is increased, the discrepancy becomes greater between the actual and needed lens shift. This same discrepancy also occurs if the orthogonal method is used for the digital lens shading correction function as well.

Obtaining the optimized microlens and color filter array location for a pixel array is becoming increasingly important as modern technologies require a reduced pixel size with increased image quality. In addition, many imaging lenses for mobile applications, such as e.g., cellular telephones, which are becoming increasingly popular, have significant non-linear dependence of the chief ray angle as a function of field. The relative illumination curve as a function of field is non-linear for most of these applications as well. As stated above, traditional methods for optimizing these arrays are not sufficient.

Accordingly, there is a need and desire for a method of calculating microlens-color filter array shift for lenses having a non-linear correlation of chief ray angle and image height. An improved method of performing digital lens shading correction is also desired.

BRIEF SUMMARY OF THE INVENTION

Exemplary embodiments of the invention include an image sensor formed with shifts among the optical parts of the sensor and the photosensitive parts of the sensor. Exemplary methods of calculating the desired shift are described and include a circular, symmetric design technique. The exemplary method can also be used to calculate a correction coefficient for performing shading correction on signals that are output from the array and digitized.

BRIEF DESCRIPTION OF THE DRAWINGS

The above-discussed and other features and advantages of the invention will be better understood from the following detailed description, which is provided in connection with the accompanying drawings, in which.

DETAILED DESCRIPTION OF THE INVENTION

The term "pixel," as used herein, refers to a photo-element unit cell containing a photosensor device and associated structures for converting photons to an electrical signal. For purposes of illustration, a representative three-color R, G, B pixel array is described herein; however, the invention is not limited to the use of an R, G, B array, and can be used with other color arrays, one example being C, M, Y, K (which represents cyan, magenta, yellow and black color filters). In addition, the invention can also be used in a mono-chromatic array where just one color is sensed by the array. Accordingly, the following detailed description is not to be taken in a limiting sense, and the scope of the present invention is defined not by the illustrative embodiments, but by the scope of the appended claims.

It should also be understood that, taken alone, a pixel does not distinguish one incoming color of light from another and its output signal represents only the intensity of light received, not any identification of color. For purposes of this disclosure, however, pixels will be referred to by color (i.e., "red pixel," "blue pixel," etc.) when a color filter is used in connection with the pixel to focus a particular wavelength of light, corresponding to a particular color, onto the pixel. For example, when the term "red pixel" is used herein, it is referring to a pixel associated with a red color filter that filters wavelengths of light within a wavelength range encountered at about 650 nm to the underlying pixel. Similar wavelength ranges exist for the "blue" and "green" pixels which are centered about a respective blue and green wavelength for each.

The phrase "microlens-color filter array" refers to a microlens array and its associated color filter array. The arrays may have a one-to-one correspondence between microlenses and color filters, or it may have some other ratio of microlenses to color filters.

Finally, while the invention is described with reference to a semiconductor-based imager, such as a CMOS imager, it should be appreciated that the invention may be applied in any micro-electronic or micro-optical device that requires high quality microlenses for optimized performance. Other exemplary micro-optical devices that can employ the invention include CCD imagers and display devices as well.

Figure 6:
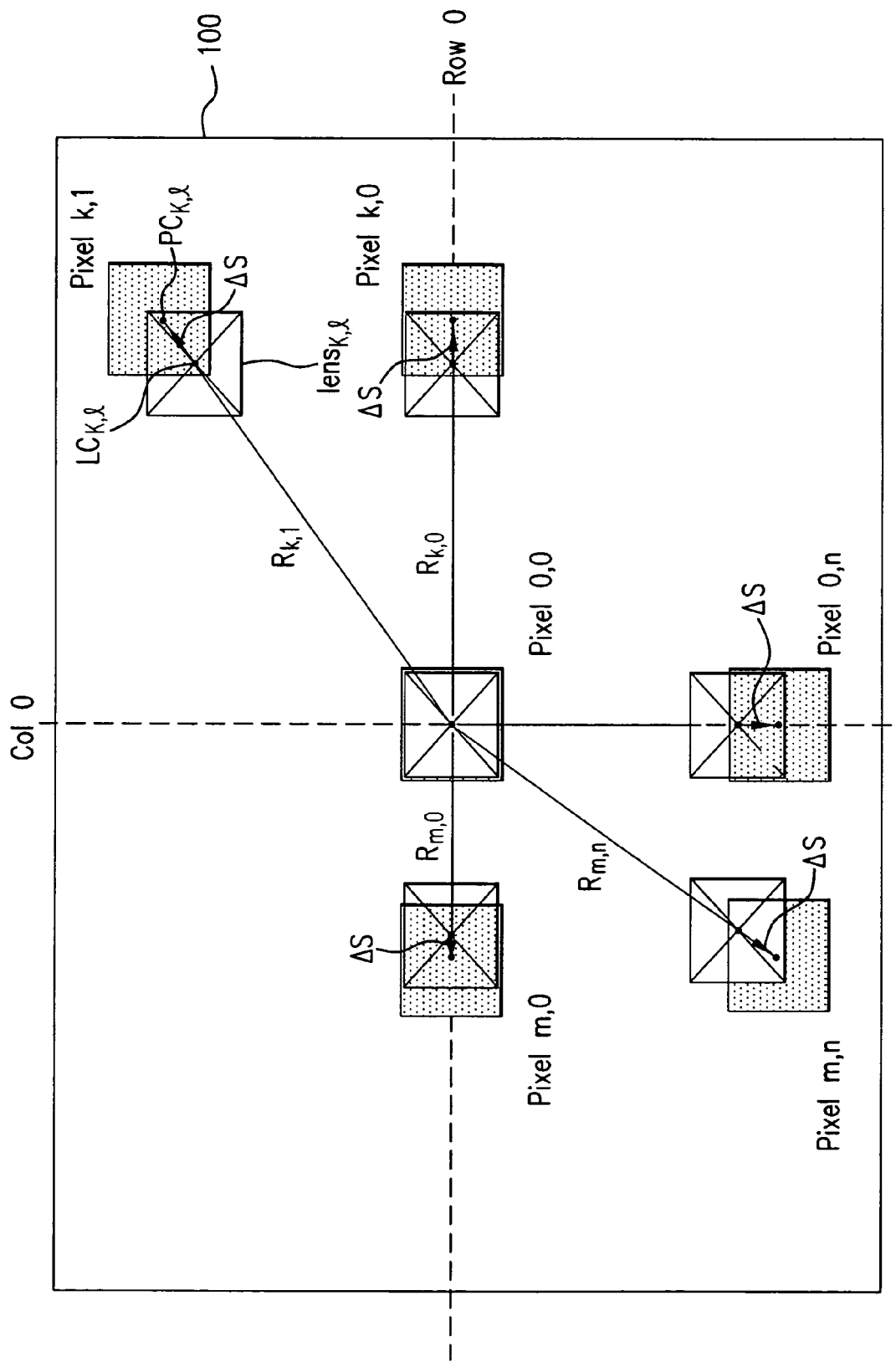
FIG. 6 illustrates microlens shifting in accordance with an exemplary embodiment of the invention.

Turning now to the figures were like numerals represent like elements, FIG. 6 illustrates a microlens-color filter array shift method performed in accordance with an exemplary embodiment of the invention. The exemplary method comprises a circular, symmetrical method used in creating a microlens-color filter design. The method can be performed to determine the optimal placement of each individual microlens and color filter; or alternatively, the method can be performed for a group of microlenses and corresponding filters at a time. In the latter case, the optimal placement for the center of a group of lenses can be determined, for example, for an underlying 2-by-2 grid of pixels. For purposes of simplification, however, most of the discussion of the exemplary method will refer to calculating the optimal shift for each individual microlens corresponding to each underlying pixel.

Figure 6A:
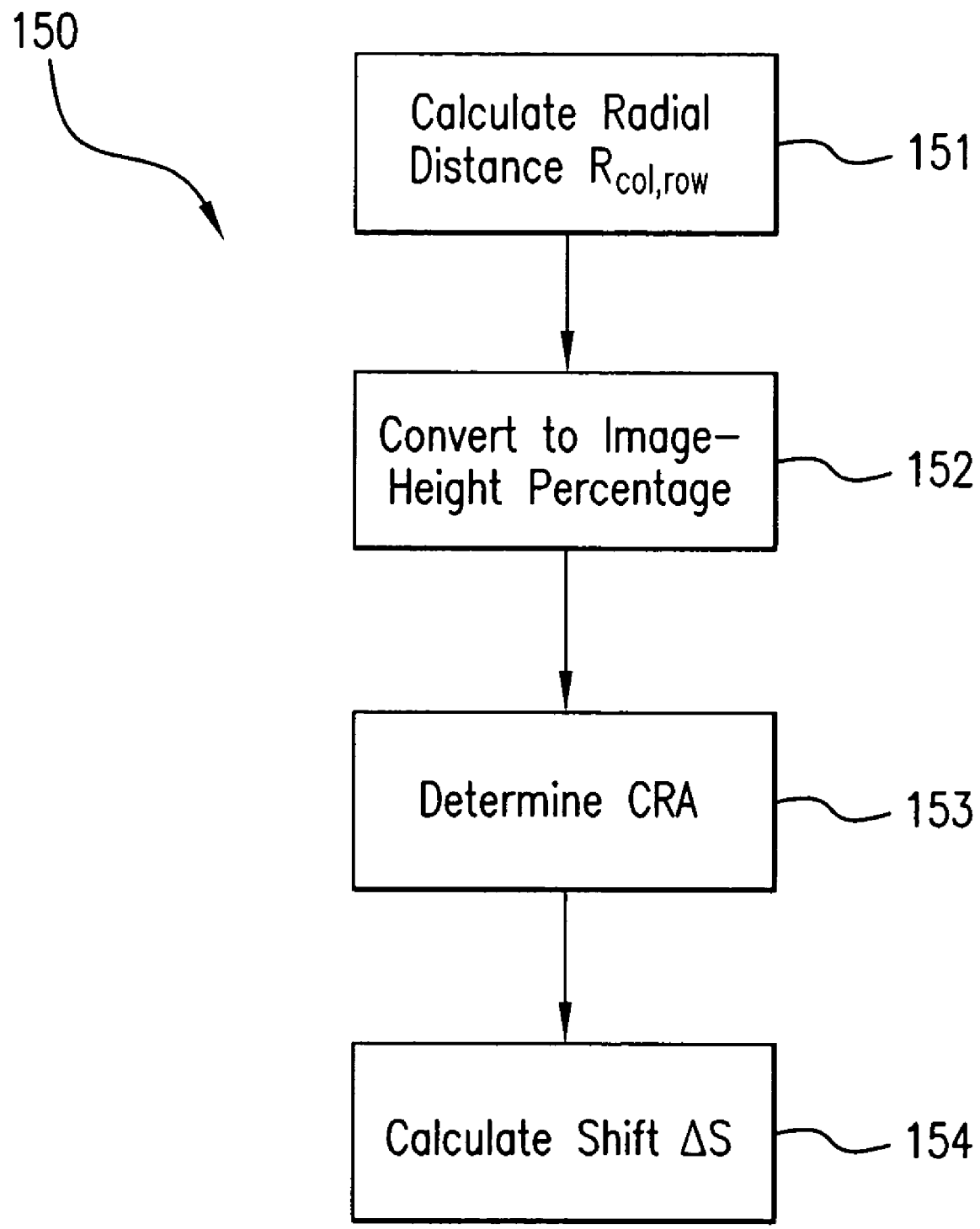
FIG. 6a is a flow chart illustrating an exemplary method of calculating a microlens shift in accordance with the invention.

With reference to FIGS. 6 and 6a, the optimal placement of microlenses is determined for an imaging pixel array 100 is now described in accordance with the invention. It should be understood that the imaging array 100 includes a pixel array arranged in a plurality of columns and rows, underlying a microlens array and a color filter array. As shown in FIG. 6, each pixel is herein described with reference to its location within a particular column and row, and will be denoted as $Pixel_{col.,row}$.

As an initial step 151 in the exemplary method 150 (FIG. 6a), a radial distance "R" from the center of the array 100 to the center of each individual pixel is calculated. For example, for pixel $Pixel_{k,1}$, the distance $R_{k,1}$, is calculated from the center of the array to the pixel center $PC_{k,1}$. Each of these radial distances is then, at step 152, converted to an image height percentage, where zero percent corresponds to a pixel having a center located at the center of the entire imaging array 100, and where 100 percent corresponds to a pixel being located at a diagonal edge from the center of the array 100 (assuming that the array 100 is square—otherwise, 100 percent refers to the radially furthest pixel away from the center).

Figure 1:
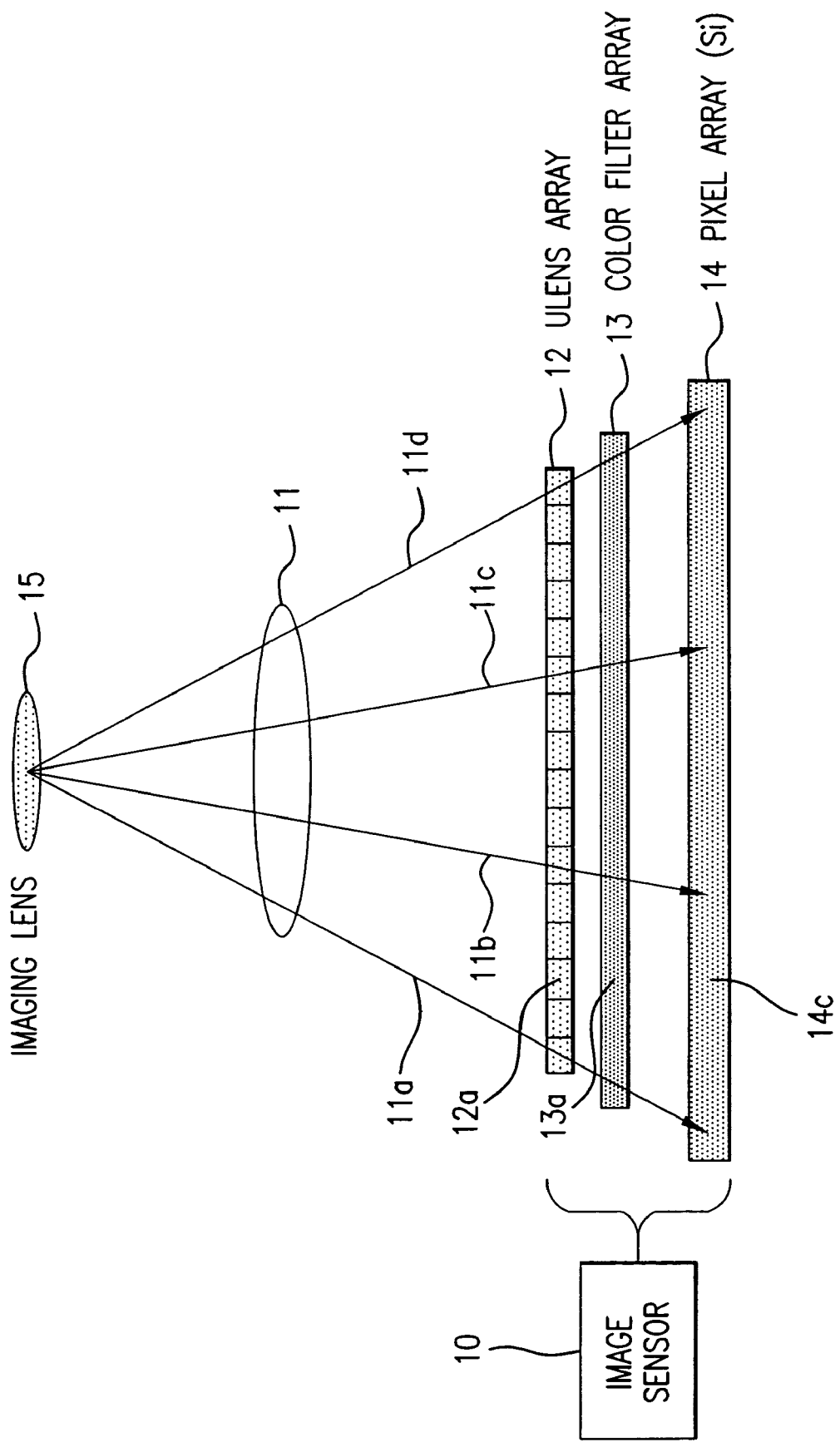
FIG. 1 illustrates the principle of microlens and color filter array shift with respect to an underlying pixel array.
Figure 2:
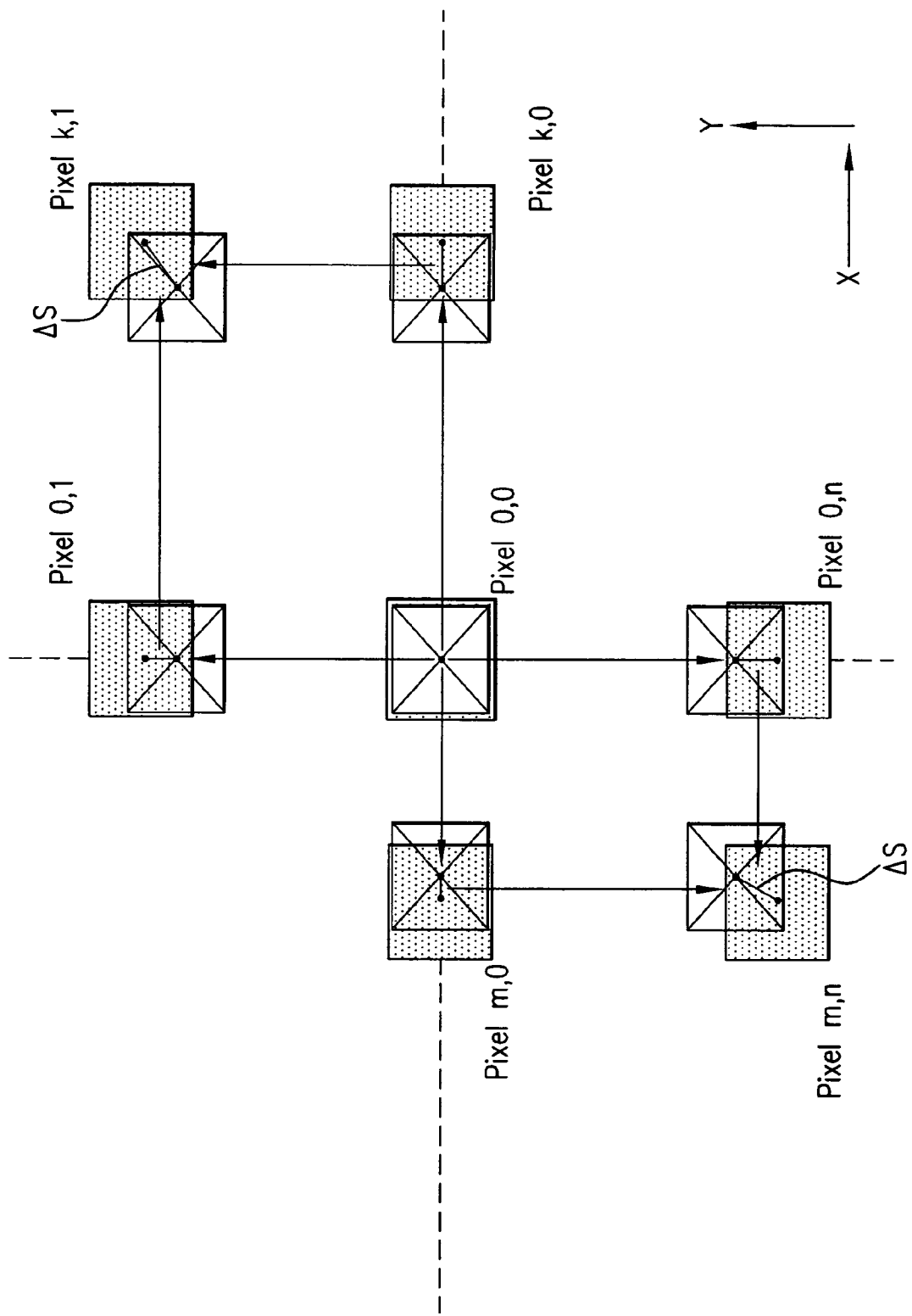
FIG. 2 illustrates microlens shifting using known, orthogonal-based algorithms for calculating the lens shift.
Figure 3B:
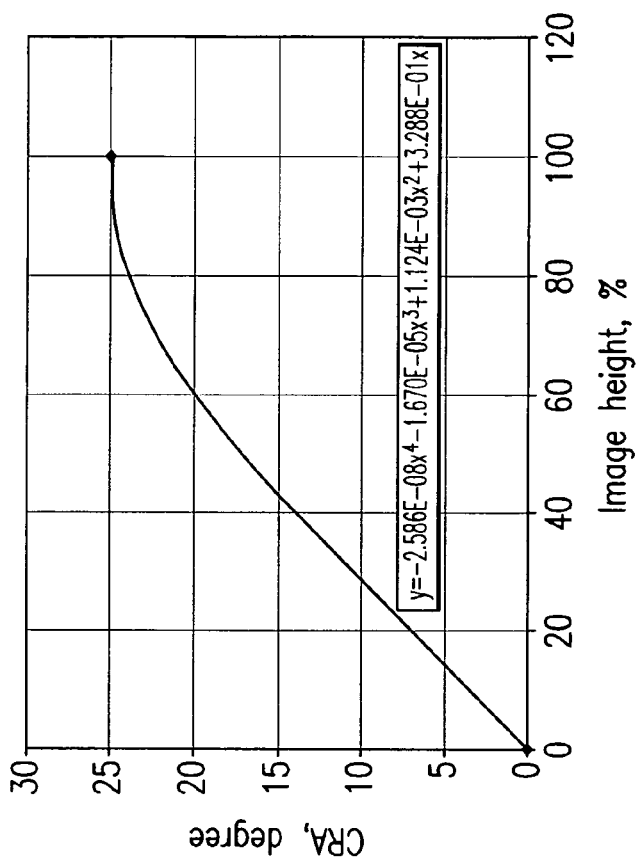
FIG. 3b is a graph illustrating a typical, non-linear chief ray angle characteristic for an imaging lens.
Figure 3A:
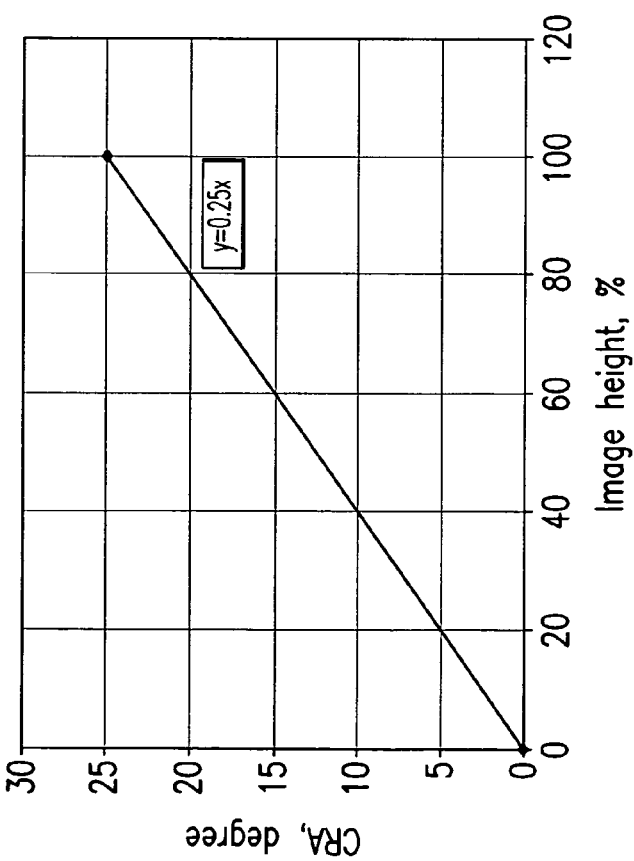
FIG. 3a is a graph illustrating a typical, linear chief ray angle characteristic for an imaging lens.
Figure 4:
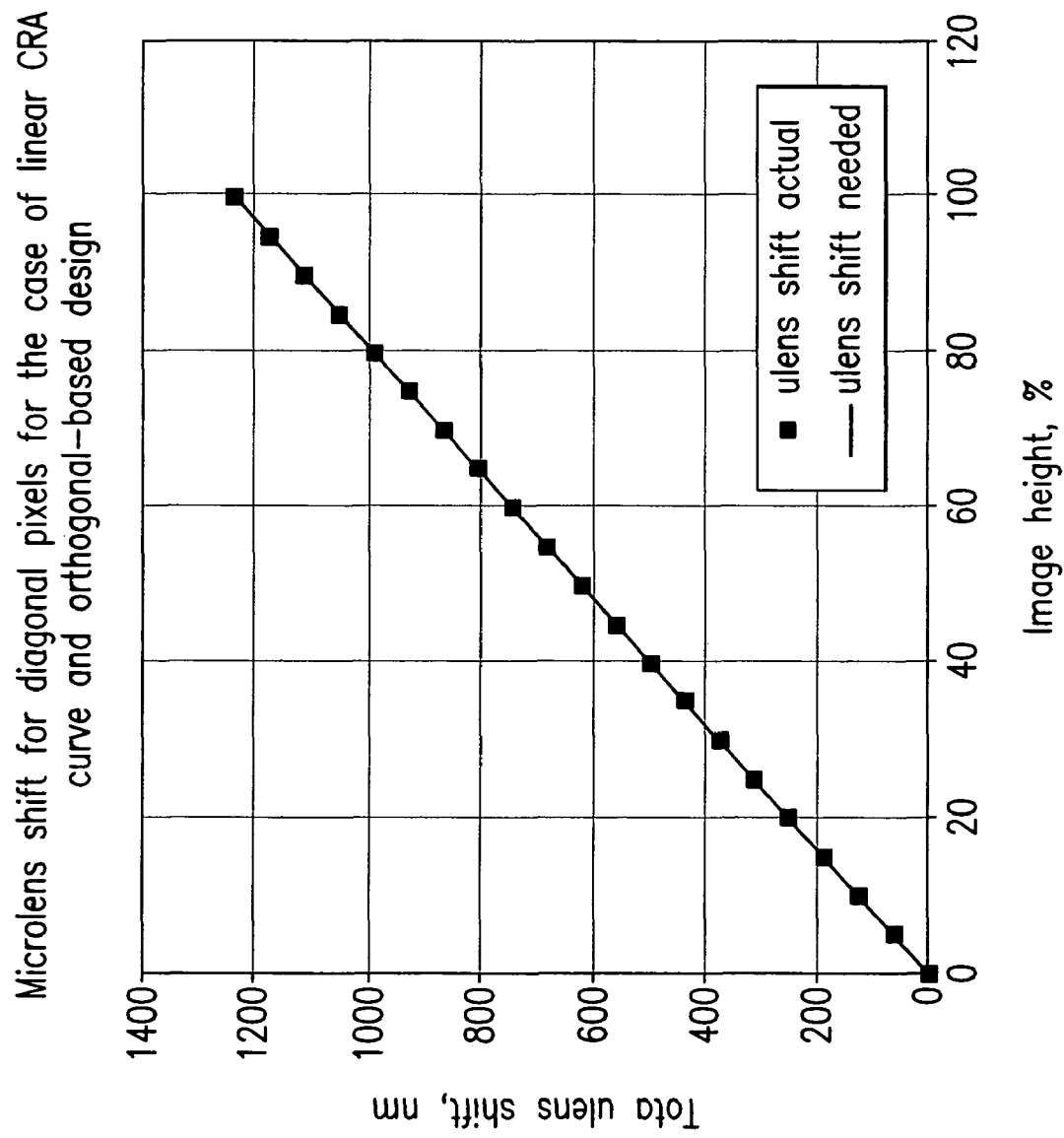
FIG. 4 is a graph illustrating a microlens shift as a function of image height for pixels having a linear chief ray angle characteristic.
Figure 5:
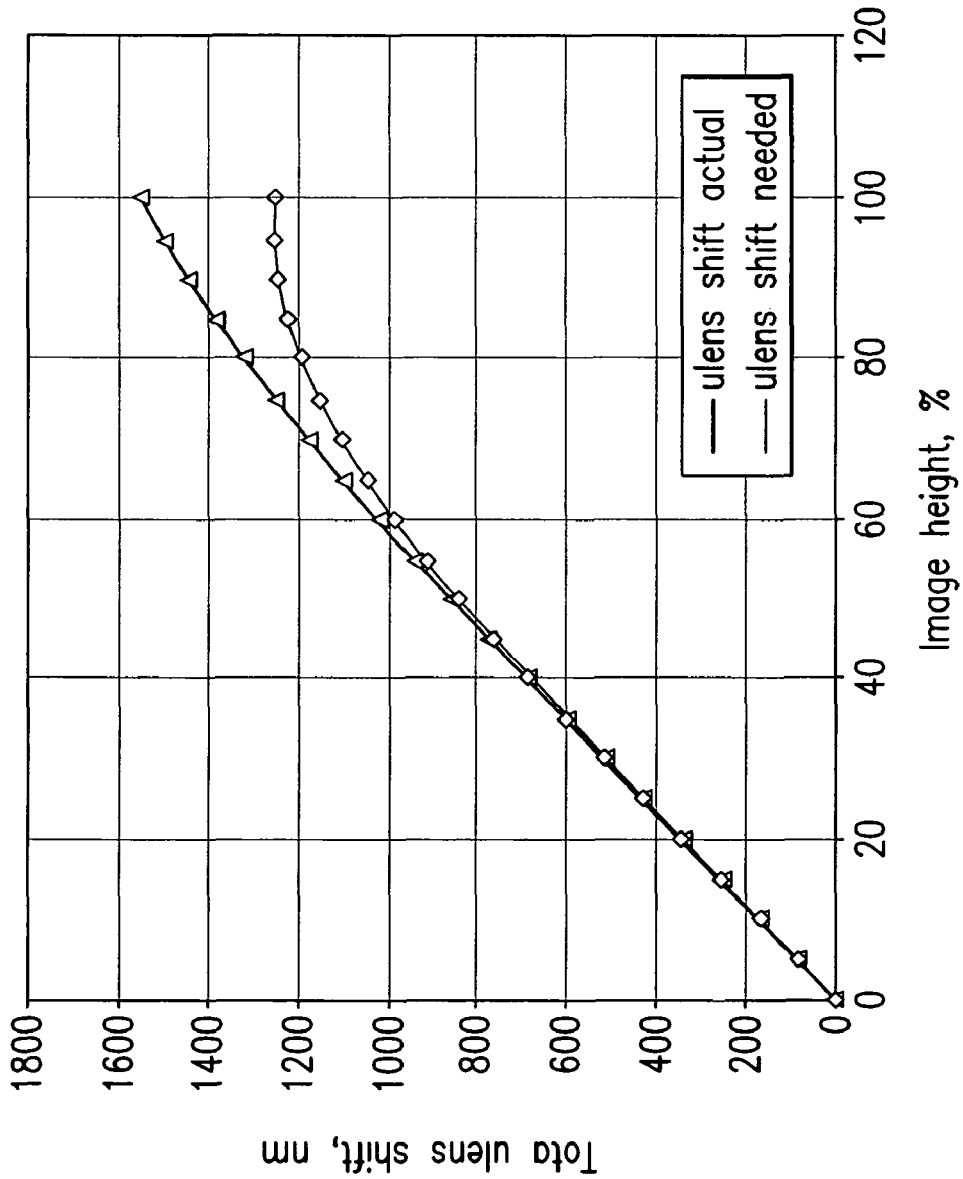
FIG. 5 is a graph illustrating a microlens shift as a function of image height for pixels having a non-linear chief ray angle characteristic.

Next, at step 153, using the image height percentage calculated at step 152, the optimal chief ray angle ("CRA") is determined. With reference to FIG. 3b (an exemplary CRA versus image height curve), once the appropriate CRA curve for the imaging system is found, the optimal chief ray angle is determined using a look-up-table procedure. The CRA curve is a characteristic of the particular imaging lens (lens 15 in FIG. 1) used in the system.

Next, at step 154, the optimal microlens shift $\Delta S_{k,1}$ is determined for each pixel. The optimal shift is a function of the chief ray angle, the distance between the microlens and the substrate containing the photosensors, the optical properties of the dielectric layers between the substrate and the microlens, and the wavelength of the incoming light. Once the shift $\Delta S_{k,1}$ is calculated for each pixel, the design of the microlens array is determined and created based upon shifting the location of the center of each individual microlens $LC_{k,1}$ from the center of the underlying pixel $PC_{k,1}$ a distance $\Delta S_{k,1}$ in the direction towards the center of the array 100. A mask, or frame, used in microlens array fabrication can then be made based upon this design.

Figure 7:
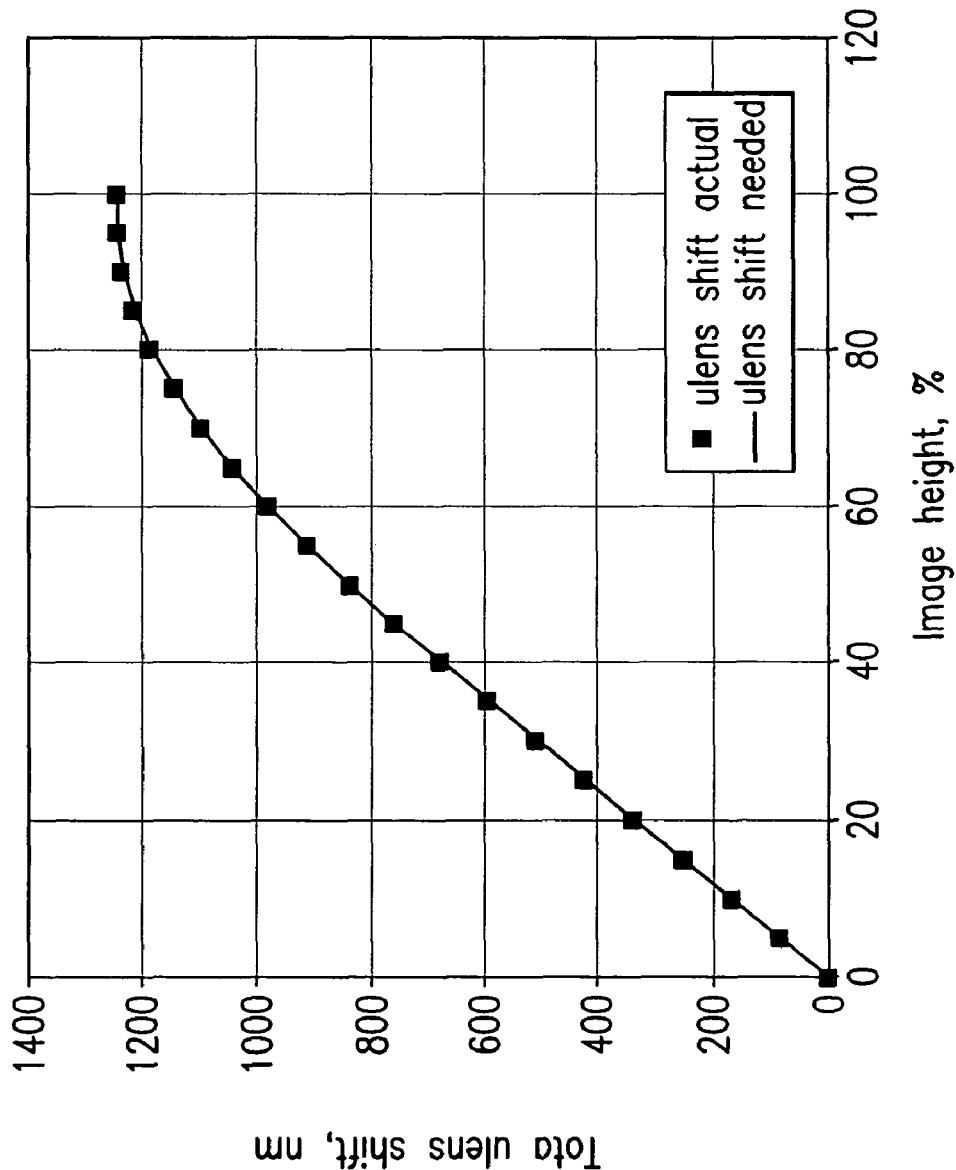
FIG. 7 is a graph illustrating a microlens shift as a function of image height for pixels having a non-linear chief ray angle characteristic, using a microlens shift algorithm in accordance with an exemplary embodiment of the invention.

As shown in FIG. 7, a microlens array having microlenses shifted as calculated using the present invention results in an ideal design for non-linear CRA curve imaging systems. In addition, the same method can be used for determining the position of each color filter used in connection with array 100. In general the color filter shift is proportional to the height above the substrate. Thus, if a planarization layer is not used between the color filter and the microlens, the shift of the color filter is the same as the shift for the microlens. If, however, one or more planarization or other layers are formed between the microlens and the color filter arrays, the optimal shift for each color filter should be calculated according to the method described above.

As mentioned above, the method 150 of the invention can also be used for groups of pixels, rather than for individual pixels with slight modification. As an example, one optimal shift calculation can be derived for four microlenses in a 2-by-2 grid. Assuming that a Bayer pattern color filter array is used, the 2-by-2 grid would contain two green pixels, a red pixel, and a blue pixel. In this case, the optimal shift is determined for each pixel, as described above, and an average shift over the grid is determined. Alternatively, one microlens may be used to cover more than one underlying pixel. In that case, the calculated shift for the shared microlens is the average of the optimal shifts calculated individually for each of the underlying pixels.

Figure 8:
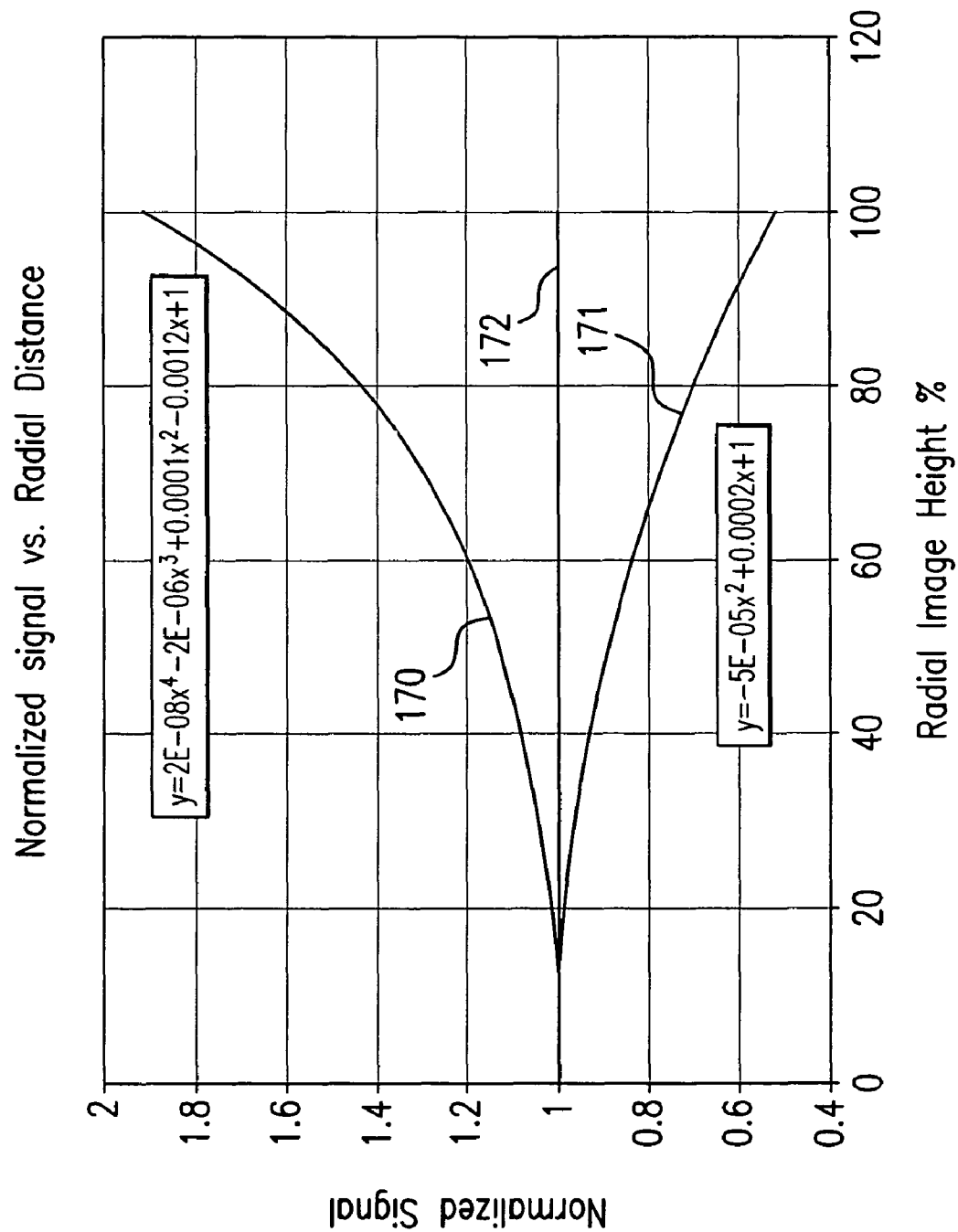
FIG. 8 is a graph illustrating signal degradation and correction in accordance with an exemplary embodiment of the invention.
Figure 9:
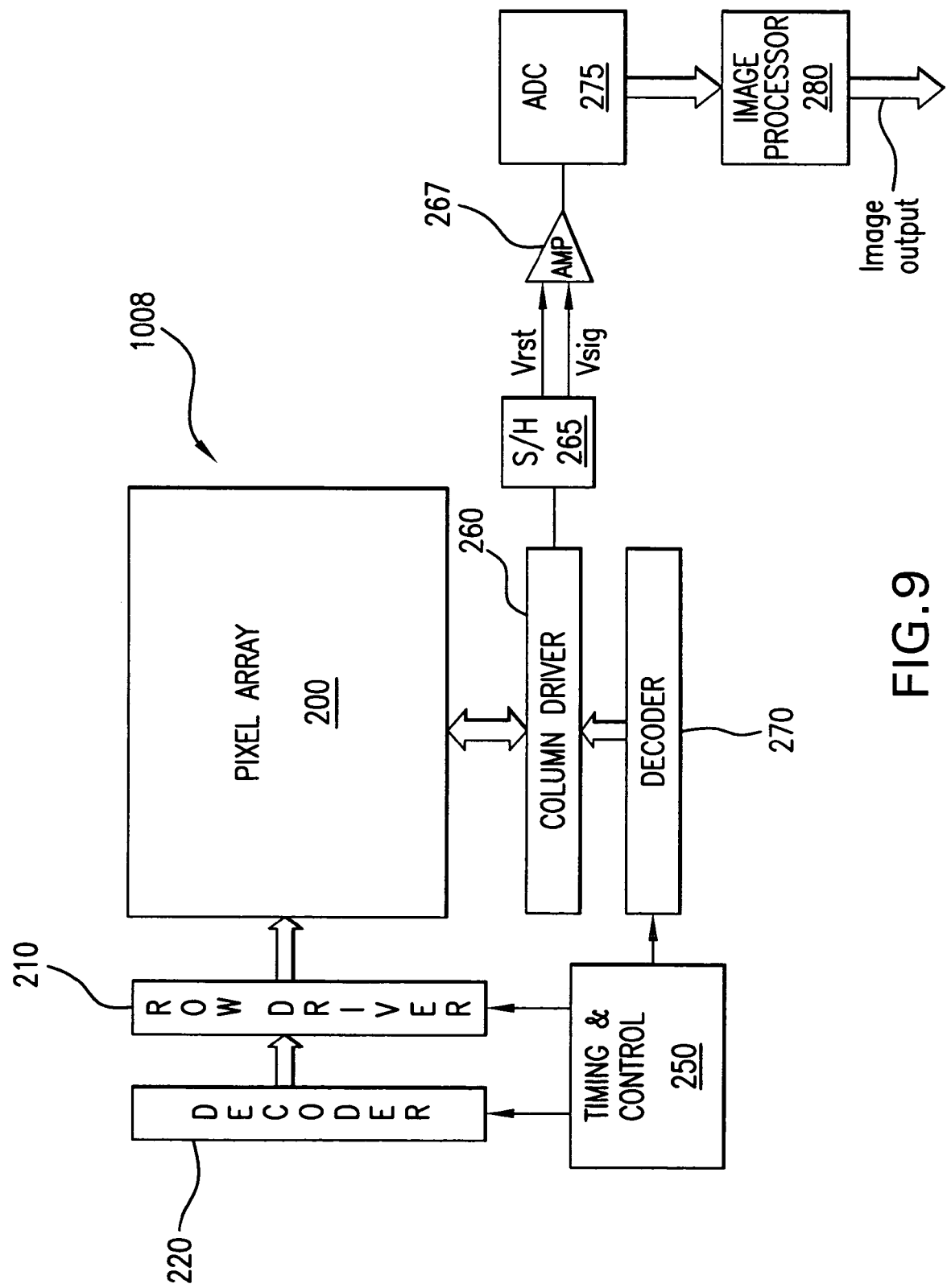
FIG. 9 is a block diagram of a CMOS imager constructed in accordance with the invention.

With reference to FIG. 8, the above method can also be used to calculate the correction coefficient for a digital lens shading correction procedure. This procedure is performed by image processing circuitry 280 (FIG. 9). The lower curve 171 of FIG. 8 represents a graph of the signal degradation across a pixel array as the radial image height percentage goes from 0 to 100 (i.e., moving from the center to the edge of the image). As shown on the graph, the normalized signal received from a pixel at the edge of the array (100 on the X-axis), is approximately 0.5 times the signal that is received from a pixel in the center of the same array. Accordingly, the correction coefficient for this signal correction procedure is the number that is multiplied times the output, digitized signal to determine a normalized value for the signal.

The upper curve 170 on FIG. 8 represents the desired coefficient. In accordance with the invention, the radial distance from the center of the array is calculated for each pixel. As set forth above, this number is converted to an image height percentage. Using that percentage, a look-up procedure is done using the graph of FIG. 8 to determined the appropriate coefficient. As shown in FIG. 8 by the straight line 172 across the chart, applying the appropriate correction coefficient to the signal received from each pixel results in a normalized illumination signal value across the entire array.

FIG. 9 illustrates a block diagram of a CMOS imager device 1008 having an imaging array 200 as described above. Imaging array 200 includes a plurality of pixels sensor cells, color filters, and microlenses arranged in a predetermined number of columns and rows (not shown). The pixels of each row are all turned on at the same time by a row select line, and the pixels of each column are selectively output by respective column select lines. A plurality of row and column lines are provided for the entire array 200. The row lines are selectively activated in sequence by a row driver 210 in response to row address decoder 220. The column select lines are selectively activated in sequence for each row activation by a column driver 260 in response to column address decoder 270. Thus, a row and column address is provided for each pixel.

The CMOS imager device 1008 is operated by a control circuit 250, which controls address decoders 220, 270 for selecting the appropriate row and column lines for pixel readout. Control circuit 250 also controls the row and column driver circuitry 210, 260 so that they apply driving voltages to the drive transistors of the selected row and column lines. The pixel output signals typically include a pixel reset signal Vrst taken off of a floating diffusion region when it is reset by the reset transistor and a pixel image signal Vsig, which is taken off the floating diffusion region after photo-generated charges are transferred to it. The Vrst and Vsig signals are read by a sample and hold circuit 265 and are subtracted by a differential amplifier 267, to produce a differential signal Vrst-Vsig for each pixel. Vrst-Vsig represents the amount of light impinging on the pixels. This difference signal is digitized by an analog-to-digital converter 275. The digitized pixel signals are fed to an image processor 280 to form a digital image output. The digitizing and image processing can be located on or off the imager chip. In some arrangements the differential signal Vrst-Vsig can be amplified as a differential signal and directly digitized by a differential analog to digital converter. The image processor 280 will typically perform the process flow described above.

Figure 10:
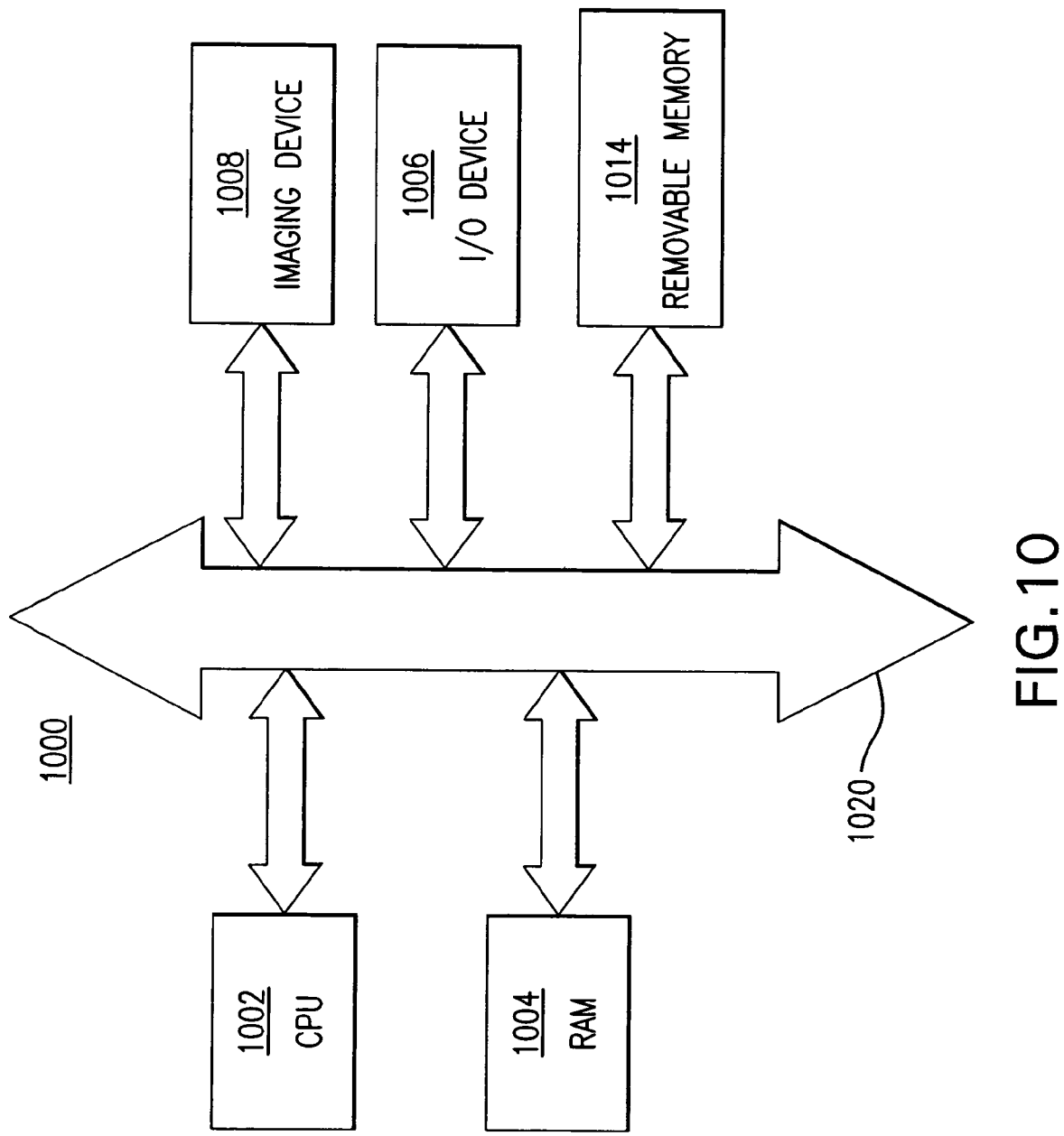
FIG. 10 is a block diagram of a processor system incorporating at least one imager device constructed in accordance with an embodiment of the invention.

FIG. 10 shows a system 1000, a typical processor system modified to include an imaging device 1008 (FIG. 9) of the invention. The processor system 1000 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, an image stabilization system.

System 1000, for example a camera system, generally comprises a central processing unit (CPU) 1002, such as a microprocessor, that communicates with an input/output (I/O) device 1006 over a bus 1020. Imaging device 1008 also communicates with the CPU 1002 over the bus 1020. The processor-based system 1000 also includes random access memory (RAM) 1004, and can include removable memory 1014, such as flash memory, which also communicates with the CPU 1002 over the bus 1020. The imaging device 1008 may be combined with a processor, such as a CPU, digital signal processor, or microprocessor, with or without memory storage on a single integrated circuit or on a different chip than the processor.

It should be understood the invention is in no way limited to the sequence of steps or the standards of color signal processing as described herein. As such, the above description and drawings are only to be considered illustrative of exemplary embodiments which achieve the features and advantages of the invention. Modification of, and substitutions to, specific process conditions and structures can be made without departing from the spirit and scope of the

What is claimed as new and desired to be protected by Letters Patent of the United States is:

1. A method of calculating microlens shift for groups of pixels, the method comprising the acts of:

for each group of pixels of a pixel array, calculating a microlens shift for each pixel contained in the group by:

calculating a radial distance that the pixel is away from a center of the pixel array, the pixel being associated with a microlens;

converting the radial distance to an image height percentage;

determining a chief ray angle based on the image height percentage; and using the chief ray angle to determine the microlens shift for the microlens;

computing an average shift for each group of pixels by averaging the microlens shifts for the pixels contained in the group; and using the average shift as the desired shift for the respective group of pixels.

2. The method of claim 1, wherein the desired shift is in a direction from a center of the respective group of pixels toward the center of the pixel array.

3. The method of claim 1, wherein the act of determining a chief ray angle comprises obtaining a chief ray angle curve for an imaging lens used in connection with the microlens.

4. The method of claim 1, further comprising the acts of: determining a distance from the microlens to the underlying pixel in a substrate; determining a wavelength for incoming light; and determining optical properties for any dielectric layers that may be located between said microlens and said substrate.

* * * * *